United States Patent [19]

Hampson

[11] Patent Number: 4,558,212

[45] Date of Patent: Dec. 10, 1985

[54] CONTAINER REDEMPTION METHOD AND APPARATUS

[75] Inventor: Alfred A. Hampson, Portland, Oreg.

[73] Assignee: Can and Bottle Systems, Inc., Portland, Oreg.

[21] Appl. No.: 458,350

[22] Filed: Jan. 17, 1983

[51] Int. Cl.4 .......................................... G06K 15/00
[52] U.S. Cl. .................................... 235/383; 235/385
[58] Field of Search .............. 235/383, 464, 467, 385; 209/523, 524, 592

[56] References Cited

U.S. PATENT DOCUMENTS

| | | | |
|---|---|---|---|
| 3,969,228 | 7/1976 | Browning | 209/523 |
| 4,148,397 | 4/1979 | Altenpohl | 209/592 |
| 4,248,389 | 2/1981 | Thompson | 209/524 |
| 4,299,326 | 11/1981 | Ulch | 209/592 |
| 4,344,493 | 8/1982 | Salmonsen | 209/592 |

Primary Examiner—Harold I. Pitts
Attorney, Agent, or Firm—Kolisch, Hartwell & Dickinson

[57] ABSTRACT

A method and apparatus for the selective sorting, separating and redemption-handling of redeemable food containers, such as beverage containers. The apparatus includes a weighing station to determine that received containers are empty, and a reading station for reading coded markings (indicia) on containers to determine information such as: authorized redeemability, product brand, and product distribution source. A digital computer monitors data acquired from "reading" operations, controls redemption processing and generates "management" records which are usable by customers to obtain redemption refunds, and by the store (associated with the apparatus) to facilitate accounting with the appropriate distributors, according to product brands.

5 Claims, 1 Drawing Figure

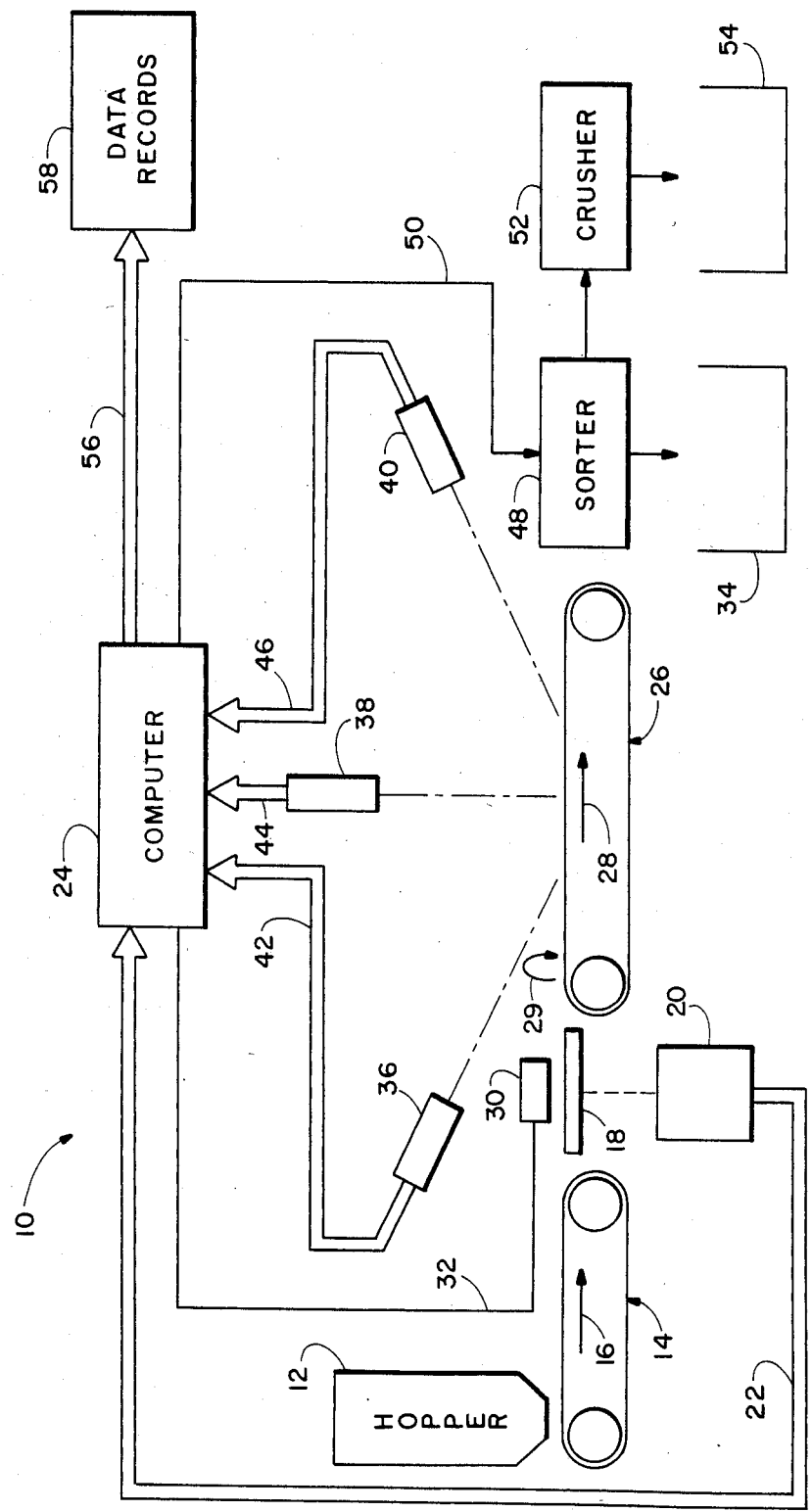

CONTAINER REDEMPTION METHOD AND APPARATUS

BACKGROUND AND SUMMARY OF THE INVENTION

This invention pertains to a method and apparatus for sorting and handling redeemable food containers, such as beverage containers. More particularly, it relates to such a method and apparatus which, among other things, is designed to read coded information on the outside of such a container to determine whether the container is properly redeemable, to separate redeemable and nonredeemable containers, and to produce a management accounting record relating to redemption refunding.

For the purpose of illustration herein, a preferred embodiment of the apparatus is described in conjunction with the redemption-handling of conventional metallic beverage containers (typically aluminum and steel). However, and as will become apparent, the apparatus proposed herein can readily be employed to handle other kinds of redeemable food containers, such as plastic and glass beverage containers. Accordingly, the term "container", as employed in the claims, refers to all such In recent years, several states have adopted mandatory deposit statutes under which food containers, such as carbonated beverage containers (aluminum and steel cans, plastic and glass bottles), are required to "carry" a monetary deposit, that is intended to promote return and recycling of a container after use. A result which has accompanied the general success of such legislation respecting recycling is that the usual redemption market outlets have had to devote considerable space and employee time to redemption-handling.

In light of the enormous handling task brought about by such deposit statutes, much consideration has been given by me to the successful development of some sort of automatic redemption system which is capable of offering high-speed, economical, accurate return-handling. Among the important considerations that relate to such a system are (1) its ability to determine that a returned container is properly redeemable (authorized) in the particular state where the system is used, and (2) its ability to identify properly returned containers according to their different sources of origin. Ideally, such a system will additionally have the ability to reject from (further) automated redemption-processing any container which either is so badly deformed or marred that its coded indicia cannot be read, or one that is still completely or partially filled.

A general object of the present invention, therefore, is to provide an automatic container-redemption method and apparatus which offers all of the features and advantages set forth above as being important to the successful implementation of such a system.

More particularly, an object of the invention is to provide such a method and apparatus which will function speedily and reliably to receive, identify and separate redeemable and nonredeemable containers of the type generally mentioned above.

A related object is to offer such a method and apparatus whereby accurate redemption-accounting, or management, records are produced relative to those containers which are found to be properly redeemable.

In general terms, the apparatus of the present invention, as disclosed particularly below, examines a received container (can, as illustrated herein) for two principal characteristics, each of which bears on the question of whether the apparatus will accept or reject the container. These two factors are weight, and carriage or readability, of externally exposed coded information (indicia) that indicates authorized redeemability for a particular container. In addition, the apparatus of the invention examines a received container for the legibility of other externally readable coded indicia which contain information regarding product brand and distribution source. This latter-mentioned information is important, as will be explained, for various accounting purposes, and for complete, automated redemption-handling.

As most people are aware, substantially every consumer product on the U.S. market bears what is known as a Universal Product Code (UPC) which, among other things, uniquely identifies the product, its producer, and usually its local or regional distribution source. It is from the UPC that the apparatus of the present invention determines the accounting-important information mentioned above. To date, in a situation where only several states have adopted deposit legislation, efforts to encourage that the UPC further contain, on a state-by-state basis, information regarding authorized redemption in a particular state, have failed. Clearly the UPC can be augmented to contain this kind of information, and probably will be so augmented as deposit-type legislation appears in more states.

In order to deal with the problem of authorized-state redeemability, and after I conceived the invention which is disclosed herein, another inventor and I conceived and developed a code structure, and a method and apparatus for reading such a structure, which can be used conveniently in the absence of such UPC augmentation. According to those later inventions, an end of a container is suitably marked with a pattern of coded indicia that relates particularly to authorized state redeemability. These later developments are disclosed in copending U.S. patent applications which are identified as follows: Ser. No. 353,365, filed by Alfred A. Hampson and Thomas B. Hutchins (deceased) on Mar. 1, 1982 for "Redeemable Container With End Closure Redemption Code", and U.S. Pat. No. 4,493,989, to Alfred A. Hampson and Thomas B. Hutchins (deceased) on for "Container End Code Redemption Scanning". Reference is hereby made to the disclosures in that application and patent for a detailed understanding of the "end-code" inventions just mentioned.

The preferred embodiment of the apparatus described herein (for handling metallic beverage containers) takes into account the features disclosed in these two prior-filed applications. In addition, the apparatus of the invention, as will be seen shortly, is constructed to have, without any modification whatsoever, the capability of acquiring information from an augmented UPC, such as the one discussed above. In other words, the apparatus of the invention is not limited to the handling of containers which are encoded and processed in accordance with the two above-mentioned prior-filed applications.

According to the preferred embodiment of the apparatus of the invention, which has been discussed generally above, the same includes an intake station where customers can deliver, in bulk, a collection of beverage cans for redemption. Downstream at any suitable location from the intake station is a weighing station which receives cans seriatim, and weighs them to determine that they do not exceed the weight of a conventional steel beverage container. A can weighed and found to exceed this weight is ejected from the system in order to insure that partially or completely filled containers are removed from (further) automated handling.

Adjacent the weighing station, cans are carried endo along a conveyor, and while so conveyed are rotated rapidly about their axes. Positioned adjacent this conveyor are plural laser scanners which "look" at the sides and opposite ends of cans to derive, as will be detailed below, information relating to authorized redeemability, product brands and distribution sources. Redundant end readers are provided for handling those cans which are specially encoded according to the two prior patent applications mentioned above. Redundancy, of course, is necessary to accommodate different cans which may travel through the apparatus with different ends leading their travel.

Supervising and monitoring the operations of the weighing station, of the laser scanners and of other equipment, is a programmed digital computer which determines the processing of each can delivered to the system. Deformed defaced, or misprinted (nonreadable) and overweight cans are returned to the customer without redemption, and are ejected from the apparatus. Properly redeemable cans are retained by the apparatus for further processing, such as crushing, and with respect to these cans, summary redemption records are generated by the computer for two principal purposes. One is to provide the usual store, where the redemption apparatus is used, with management accounting data relating to how many cans, of which brand, and from which producer, have been received, so that the store can collect the various deposits which it paid at the time of receiving the products. Another is to provide the redeeming customer with an accounting for what he or she has delivered to the apparatus, and to enable him or her to get an appropriate return on deposits paid.

These and other objects and advantages which are attained by the invention will become more fully apparent as the description which now follows is read in conjunction with the accompanying drawing.

DESCRIPTION OF THE DRAWING

The drawing presents a schematic representation of a preferred embodiment of the apparatus of the invention designed particularly for the redemption-handling of metallic, carbonated-beverage containers.

DETAILED DESCRIPTION OF THE INVENTION

Turning now to the drawing, indicated generally at 10 is a redemption-handling apparatus which is constructed for performance in accordance with the present invention. More particularly, apparatus 10 has been designed to handle redeemable, metallic (steel and aluminum) carbonated-beverage containers, particularly in those states which have enacted so-called despoit legislation. As has been mentioned herein earlier, and as will be discussed with somewhat greater particularity later, apparatus 10 is fully capable of handling other similar redeemable containers, such as plastic and glass bottles used for the same types of products.

Included in apparatus 10 is a bulk-reception hopper 12 into which a consumer may dump a mixed collection of beverage cans. Hopper 12 is designed and positioned to deliver these cans, one-by-one, onto the top run of a conveyor 14, which transports the cans downstream in the apparatus, generally in the direction of arrow 16. Hopper 12 and conveyor 14 are referred to herein collectively as an intake station. Both the hopper and conveyor 14 are conventional in construction, with the hopper being constructed to deliver cans onto the conveyor so that they travel endo thereon.

Positioned immediately downstream from the off-bearing end of conveyor 14 is a platform 18 which is connected through a suitable linkage, shown by the dashed lines, to a weight measuring transducer 20. Platform 18 and transducer 20 collectively form a weighing means in apparatus 10. As each can arrives on top of platform 18, it is weighed to make certain that it is no heavier than the heaviest empty steel can which is expected to be processed by the apparatus. Weight data is communicated via a data bus 22 to a programmed digital computer 24, whose function will be elaborated later, and which is also referred to herein as programmed intelligence means.

Through conventional and well-known construction and design techniques, the feed of cans from hopper 12 via conveyor 14 to platform 18 is controlled so that cans arriving at the platform can remain there long enough to be weighed accurately without being jounced by the next-arriving can. Further, by a conventional off-bearing feed mechanism (not shown) weighed cans that meet the criteria just stated for acceptable-weight cans are shifted from platform 18 onto the top run of another conveyor 26, which continues to transport successive cans endo, generally in the direction of arrow 28. Cans which do not meet the stated weight criteria—namely cans which exceed the weight of the heaviest expected, empty steel cans are, under the control of computer 24, ejected from apparatus 10 by a suitable conventional kicker mechanism, or ejection means, 30 which is disposed adjacent a side of platform 18. Control instructions from computer 24 to mechanism 30 are transmited over a communication line indicated at 32. Cans thus ejected are received by a bin, such as the one shown generally at 34 in apparatus 10. While, in the drawing, bin 34 appears at a site which is remote from platform 18, it should be understood that this has been done in order to simplify the schematic nature of the drawing. An important reason for ejecting overweight cans is that there is a good probability such are still completely or partially filled with product, or perhaps with some other substance, which could foul downstream mechanism in apparatus 10.

With reference for a moment to remarks made earlier herein, it is currently the case that the UPC for beverage cans does not contain information regarding what has been referred herein as authorized redeemability, vis-a-vis the particular state in which the apparatus is being used. Such information, for example, is critical for distinguishing similar cans from two different states— one of which has, and the other of which does not have deposit-type legislation. The same information might also be pertinent with respect to two different states which each have such legislation but which require a different deposit level that should be identified. Accordingly, apparatus 10 has been constructed to read this kind of information which has been placed specially on the end of the can, as is discussed in the two prior-filed patent applications discussed in the preamble portion of this specification. Because one will not precisely know which end of a can is traveling upstream and which downstream, and because this may be different for different cans, redundant reading apparatus must be provided to look at both ends of each can as it travels along conveyor 26 in that region in apparatus 10 above conveyor 26 (which may be thought of as a reading zone).

Continuing with a description of the construction of apparatus 10, suitably positioned above conveyor 26 are three conventional laser scanners, shown at 36, 38, 40. These scanners are referred to herein collectively as a reading means. Scanners 36, 40, which perform respective scanning operations along the inclined dash-dot lines shown in the drawing, are positioned to read coded indicia found on an end of a can. Scanner 38 looks directly down at the top run of conveyor 26 for the purpose of reading coded indicia (typically the UPC) found on the side of a can.

Conveyor 26 is of a conventional design which, in addition to transporting cans in the direction of arrow 28, simultaneously spins cans about their respective longitudinal axes, as indicated by curved arrow 29 in the drawing.

As a consequence of the construction of conveyor 26, associated as shown with the three laser scanners, the opposite ends, and the sides, of each can transported on the conveyor are read to extract information from the UPC, and from an end code which relates to authorized redeemability. Scanners 36, 38, 40 are coupled by means of conventional data buses 42, 44, 46, respectively, to previously mentioned computer 24.

Located downstream from the off-bearing end of conveyor 28 in apparatus 10 is a conventional sorting mechanism 48 which communicates via a control line 50 with computer 24. Data fed to the computer from the scanners is interpreted in the computer to determine both whether or not each can transported on conveyor 26 is properly redeemable (authorized), and whether its UPC is fully readable. The latter consideration relates primarily to deformed, defaced or misprinted cans. If a can is determined to be properly redeemable, and its UPC is fully readable, the computer initiates what is called herein a redemption-cycle operating procedure, and instructs the sorting mechanism to "retain" the redeemable can in the apparatus for further processing. Any can which is not found to be properly redeemable, or whose UPC cannot be read, causes the computer to initiate a rejectioncycle operating procedure, whereby the can is ejected by the sorting mechanism into previously mentioned bin 34.

While further processing of properly redeemed cans could be handled in other manners, in apparatus 10, there is provided as indicated at 52 a crusher which is located downstream from sorting mechanism 48 for the receipt therefrom of acceptable cans. Crusher 52 receives such cans, and employing conventional mechanism, crushes the same and delivers crushed cans to another bin shown schematically at 54.

Completing the description of what is shown in the drawing, also coupled to computer 24, by way of another conventional data bus 56, is a block 58 labled "Data Records" in the drawing. It is to the station of this data-records block that the computer, on the basis of UPC code information relating to product brand and product distribution source, produces a recoverable accounting record respecting cans which have been accepted as redeemable by apparatus 10. In particular, at the conclusion of each redemption operation for a particular customer, there exists in the data-records block, for use by the "redemption store" which is using apparatus 10, an accounting record indicating (a) the number of cans which have been handled by the apparatus, (b) for which different products, and (c) from which different sources. Obviously it is from these records that the store proprietor can conveniently settle an accounting with his different distributors for the deposits which he has paid at the time that he acquired the different products for sale. Further, and at the conclusion of the redemption cycle for a particular customer, there is made available to the customer, via the data-records block, a printed accounting sheet which tells the customer for how many redeemed cans he or she is entitled to a deposit refund.

With respect to cans which have been ejected from the system into bin 34, a customer is typically expected to remove these. With regard to redeemed cans which have been crushed and fed to bin 54, these are collected at regular intervals from the store operator for further recycling processing.

Programming which is required in computer 24 to accomplish the operation just described, does not per se form any part of the present invention, is well within the skill of those skilled in the art of computer programming, and thus is not described herein.

It should be apparent to those skilled in the art that the unique organization of apparatus 10 described herein for the handling of metallic beverage containers can easily be structured to handle plastic or glass bottles. If desired, and with respect to such bottles, additional sorting operations may be provided for with respect to plastic and glass colors. In other words, green bottles may be separated from brown bottles, etc. In all systems, whether designed for handling cans or bottles, the basic features of the invention are present insofar as the acquisition of redemption and accounting data, and sorting according to redeemability and non-redeemability.

The use of a schematic diagram to illustrate the apparatus of the invention herein has been done because of the recognition that various different kinds of conventional equipment can be used at each of the several operating stations in the apparatus. It is the overall cooperative assembly of these various sub-parts which furnishes the unique advantages of the invention.

The method of processing performed in accordance with the invention is believed to be clear from a reading of the structural and operational description given above for apparatus 10. This method comprises the steps of:
(1) Scanning the surface of each container which is presented to the apparatus to derive information from redemption-significant, coded indicia presented on the outer surface of the container;
(2) from such scanning, generating an electrical signal (via the laser scanners) having characteristics uniquely related to information derived from scanning;
(3) coupling (via data buses 42, 44, 46) each such signal to a programmed digital computer;
(4) employing the computer to interpret each such signal to ascertain authorized container redeemability as reflected by the signal; and
(5) retaining for further processing all containers whose indicia effect an indication of authorized container reedeemability, and rejecting all other containers.

According to another view of the method of the invention, the same includes, in addition to the steps set forth immediately above, the additional steps of weighing each received container to determine whether the container exceeds a preselected maximum weight, and ejecting from all further processing containers having weights exceeding such preselected weight.

When the time comes that all coded information of the type mentioned above is contained in a single code location, such as in the UPC, and where, as is usually the case, this code appears on the side of a container, only a single laser scanner, in the position of scanner 38, is required.

A modification of the invention as described above which may be useful in many instances is one which permits a redeeming customer, to display a deformed can which is properly redeemable, but which has been rejected from the apparatus because it's coded information cannot properly be read, to display the can manually before yet another laser scanner having an exposure window on the outside of the apparatus, whereby the can may be determined to be redeemable. If such occurs, the customer would then be permitted manually to feed the container via an appropriate route to bin 54.

As is suggested above, weighing of a container takes place "downstream" from hopper 12, and in apparatus 10 is shown specifically to take place just upstream from where scanning occurs. If desired, weighing could be performed downstream from conveyor 26.

Accordingly, while a preferred embodiment of (and certain modifications in), and a method of practicing, the present invention have been described herein it is appreciated that variations and other modifications are possible and may be made without departing from the spirit of the invention.

It is claimed and desired to secure as Letters Patent:

1. Apparatus for the selective redemption-processing of authorized, redeemable beverage containers, and the like, of the type bearing externally readable, redemption-significant, coded indicia including a general UPC-type indicia on the side of the container and region specific indicia on an end of the container comprising means defining an intake station for receiving such containers and for delivering the same downstream in the apparatus, automated reading means disposed adjacent and downstream from said intake station for accepting delivered containers, and for reading, and deriving information from, such indicia, said reading means including first and second reading structure for reading, respectively, the UPC-type indicia and the region specific indicia, and programmed intelligence means operatively connected to said reading means for acquiring and interpreting such derived information, operable, with respect to each accepted container, in response to the acquisition of related derived information which reflects authorized container redeemability, to effect a redemption-cycle operating procedure whereby the associated container is retained for further handling, and management control data is generated regarding such retained container, and in response to the acquisition of related derived information which reflects non-authorized container redeemability, to effect a rejection-cycle operating procedure whereby the associated container is rejected from further redemption handling.

2. The apparatus of claim 1 which further includes, downstream from said intake station, means for weighing each delivered container to determine if the same has a weight greater than a preselected maximum weight, and ejection means operatively associated with said weighing means for ejecting from the apparatus any container having a weight exceeding said preselected weight.

3. A method for the automatic, selective redemption-processing of authorized, redeemable beverage containers, and the like, of the type bearing externally readable, redemption-significant, coded indicia, including a general UPC-type indicia on the side of the container and region specific indicia on an end of the container, said method comprising scanning the side surface of each such container which is presented for redemption to read, and derive information from, such UCP-type indicia, scanning the ends of each such container which is presented for redemption to read and derive information from such region specific indicia, from said scanning, generating an electrical signal having characteristics uniquely related to such derived information, coupling each such signal to a programmed digital computer, employing the computer, with respect to each such coupled signal, to interpret the same with respect to authorized container redeemability as reflected by the signal, and as a consequence of said interpreting, retaining for further processing all containers whose indicia effect an indication of authorized container redeemability, and rejecting all other containers.

4. The method of claim 3 which further comprises weighing each received container to determine whether the same exceeds a preselected maximum weight, and ejecting from processing all containers having weights exceeding such preselected weight.

5. The apparatus of claim 1, wherein said second reading structure includes a pair of readers disposed for reading region specific indicia appearing on either end of a container.

* * * * *